US012358284B2

(12) United States Patent
Matsumura et al.

(10) Patent No.: US 12,358,284 B2
(45) Date of Patent: Jul. 15, 2025

(54) LIQUID EJECTION APPARATUS

(71) Applicant: CANON KABUSHIKI KAISHA, Tokyo (JP)

(72) Inventors: Hideaki Matsumura, Tokyo (JP); Tsuyoshi Saeki, Kanagawa (JP); Yuri Mori, Tokyo (JP); Ken Takenaga, Kanagawa (JP); Shota Asada, Tokyo (JP); Koki Shimada, Kanagawa (JP); Daiju Takeda, Kanagawa (JP); Hiromasa Tsutsumi, Kanagawa (JP); Mineyoshi Tomie, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 18/297,925

(22) Filed: Apr. 10, 2023

(65) Prior Publication Data

US 2023/0330988 A1 Oct. 19, 2023

(30) Foreign Application Priority Data

Apr. 15, 2022 (JP) ................................ 2022-067939

(51) Int. Cl.
*B41J 2/14* (2006.01)

(52) U.S. Cl.
CPC .. *B41J 2/14016* (2013.01); *B41J 2002/14491* (2013.01)

(58) Field of Classification Search
CPC .......... B41J 2/14016; B41J 2002/14491; B41J 2/175; B41J 2/17503; B41J 2/17506; B41J 2/17509; B41J 2/17513; B41J 2/1752; B41J 2/17553; B41J 29/02; B41J 29/13
See application file for complete search history.

(56) References Cited

U.S. PATENT DOCUMENTS 6,209,980 B1 * 4/2001 Kobayashi ................. B41J 2/19 347/7
6,375,315 B1 * 4/2002 Steinmetz ............ B41J 2/17553 347/85
2001/0010532 A1 * 8/2001 Battey .................. G03G 15/553 347/86
2004/0165043 A1 * 8/2004 Sakai ................... B41J 2/17596 347/86

FOREIGN PATENT DOCUMENTS

JP 6520243 B2 5/2019

* cited by examiner

*Primary Examiner* — Anh T Vo
(74) *Attorney, Agent, or Firm* — Canon U.S.A., Inc. IP Division

(57) ABSTRACT

A liquid ejection apparatus includes a first liquid storage container, a second liquid storage container, a first terminal member, a second terminal member, and a circuit board. The first liquid storage container stores liquid to be supplied to a liquid ejection head that ejects the liquid to an ejection medium. The second liquid storage container is arranged side by side in a first direction with respect to the first liquid storage container. The first terminal member comes into contact with the liquid stored within the first liquid storage container. The second terminal member comes into contact with liquid stored within the second liquid storage container. The circuit board comes into contact with the first terminal member and the second terminal member and relatively moves in the first direction with respect to the first liquid storage container.

11 Claims, 10 Drawing Sheets

LIQUID EJECTION APPARATUS

BACKGROUND

Field

The present disclosure relates to a liquid ejection apparatus.

Description of the Related Art

Conventionally, liquid ejection apparatuses are known which are provided with ink tanks capable of storing ink to be supplied to a liquid ejection head that eject the ink. In such liquid ejection apparatuses, there are some in which the ink tank is provided with an electrode, and an amount of ink stored in the ink tank is detected by the electrode. The electrode is connected to a circuit outside the ink tank, and the liquid ejection apparatus applies a current to the electrode via the circuit. According to Japanese Patent No. 6520243, a configuration is discussed in which a single circuit unit is commonly provided on an upper surface of a plurality of ink tanks and an electrode pin provided in each ink tank is connected thereto.

However, in the configuration according to Japanese Patent No. 6520243, it is thought that if the ink tank moves due to an impact from outside the apparatus, the circuit unit connected to the ink tank also moves accordingly. At this time, even if the circuit unit follows the movement of one of the plurality of ink tanks, the other ink tanks do not necessarily follow the movement in the same way. Thus, a concern arises about the connection between the ink tank, which cannot follow the movement, and the moving circuit unit, and there is a risk of impairing reliability of the liquid ejection apparatus.

SUMMARY

The present disclosure is directed to the provision of a highly reliable liquid ejection apparatus.

According to an aspect of the present disclosure, a liquid ejection apparatus includes a first liquid storage container configured to store liquid to be supplied to a liquid ejection head configured to eject the liquid to an ejection medium, a second liquid storage container configured to be arranged side by side in a first direction with respect to the first liquid storage container, a first terminal member configured to come into contact with the liquid stored within the first liquid storage container, a second terminal member configured to come into contact with liquid stored within the second liquid storage container, and a circuit board configured to come into contact with the first terminal member and the second terminal member and to relatively move in the first direction with respect to the first liquid storage container.

Further features of the present disclosure will become apparent from the following description of exemplary embodiments with reference to the attached drawings.

DESCRIPTION OF THE EMBODIMENTS

Figure 1:
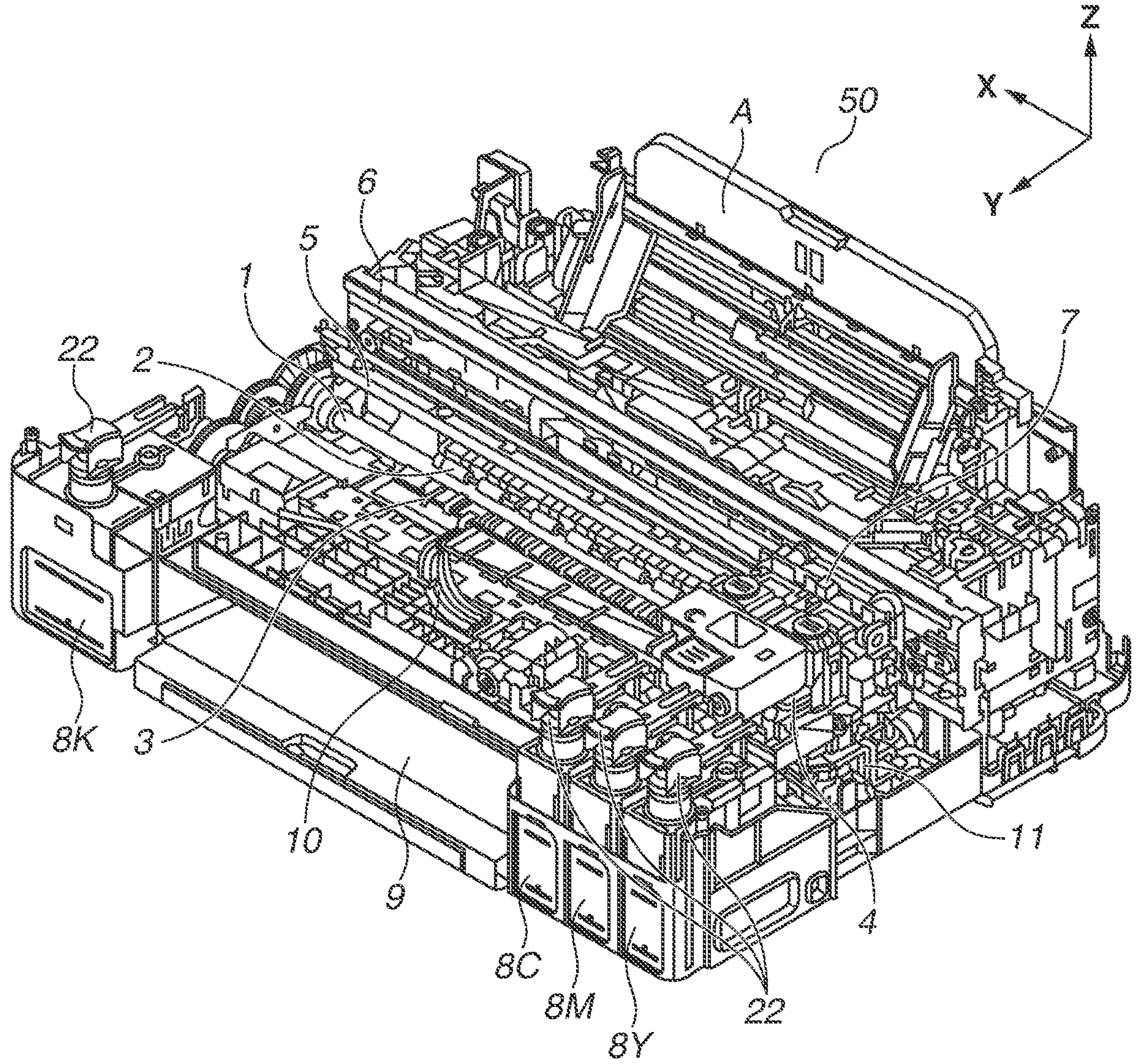
FIG. 1 is a schematic diagram illustrating an outline of a liquid ejection apparatus according to a first exemplary embodiment.

First, an outline of an ink jet recording apparatus is described as an example of a liquid ejection apparatus according to the present disclosure. FIG. 1 is a schematic diagram illustrating an ink jet recording apparatus according to a first exemplary embodiment.

An ink jet recording apparatus 50 (hereinbelow, the recording apparatus 50) includes a sheet feeding roller (not illustrated), and a recording medium loaded on a sheet feeding tray A is fed one by one by the sheet feeding roller. The fed recording medium is transmitted between a conveyance roller 1 and a pinch roller 2 and conveyed in a +Y direction in FIG. 1. The conveyed recording medium is supported from a rear side by a platen 3, so that a distance between a nozzle (not illustrated) provided on an ejection surface of a recording head 4, which is a liquid ejection head, and the recording medium, which is a liquid ejection medium, is maintained to a constant or predetermined distance. Ink, which is liquid including a coloring material, is ejected from the nozzle of the recording head 4 to the recording medium in this state, and thus recording is performed on the recording medium.

The recording head 4 includes the nozzle as an ejection port for ejecting the ink, which is liquid, and is mounted on a carriage 7. The carriage 7 is reciprocated on a carriage rail 6 in an X direction by a driving unit such as a motor. The recording head 4 ejects ink droplets while moving in a main scanning direction together with the carriage 7, and records an image for one band on the recording medium on the platen 3. Once the image for one band is recorded, the recording medium is conveyed in a conveyance direction by a predetermined amount by the conveyance roller 1 (an intermittent conveyance operation). A recording operation for the one band and the intermittent conveyance operation are repeated, and thus an image is recorded on the recording medium based on image data. The recording medium on which recording by the recording head 4 is completed is transmitted between a sheet discharge roller (not illustrated) and a spur and discharged to a sheet discharge tray 9.

The recording head 4 is provided with a unit for generating energy to be used for ink ejection (for example, a heating resistance element) especially in an ink jet recording method. The recording head 4 is not limited to a method using thermal energy, and may use vibrational energy.

The recording apparatus 50 is provided with ink tanks 8C, 8M, 8Y, and 8K (C: cyan, M: magenta, Y: yellow, and K: black), which are a plurality of independent liquid storage containers corresponding to colors of the ink ejected from the recording head 4. According to the present exemplary embodiment, in a case where the recording apparatus 50 is viewed from the +Y direction, the ink tank 8K is arranged on a left side (+X side) of the apparatus, and the ink tanks 8C, 8M, and 8Y are arranged on a right side (−X side) of the apparatus. Further, the ink tanks 8C, 8M, and 8Y are arranged side by side in the X direction and are adjacent to each other. In the following description, the ink tanks 8C, 8M, 8Y, and 8K may be simply referred to as the ink tanks 8 by omitting color notations.

The ink tanks 8C, 8M, 8Y, and 8K are connected to the recording head 4 by tubes 10 corresponding to the respective colors of the ink via joints (not illustrated). Accordingly, the color inks stored in the respective ink tanks 8 can be individually supplied to the nozzles of the recording head 4 corresponding to the respective colors of the ink. An ink injection port (not illustrated) is opened at the top of each of the ink tanks 8, and a plug member 22 is attached to be able to be opened and closed.

A recovery unit 11 is arranged in a non-recording area, which is within a range of reciprocating movement of the recording head 4 and outside a range of passage of a recording medium in conveyance of the recording medium. The recovery unit 11 is arranged to face the ejection surface on which the nozzle of the recording head 4 is formed.

The recovery unit 11 includes a cap unit (not illustrated) that covers the ejection surface of the recording head 4, a suction mechanism (not illustrated) that sucks the ink from the recording head 4 through the cap unit, and a cleaning blade (not illustrated) that wipes away dirt adhering to the ejection surface.

Figure 4:
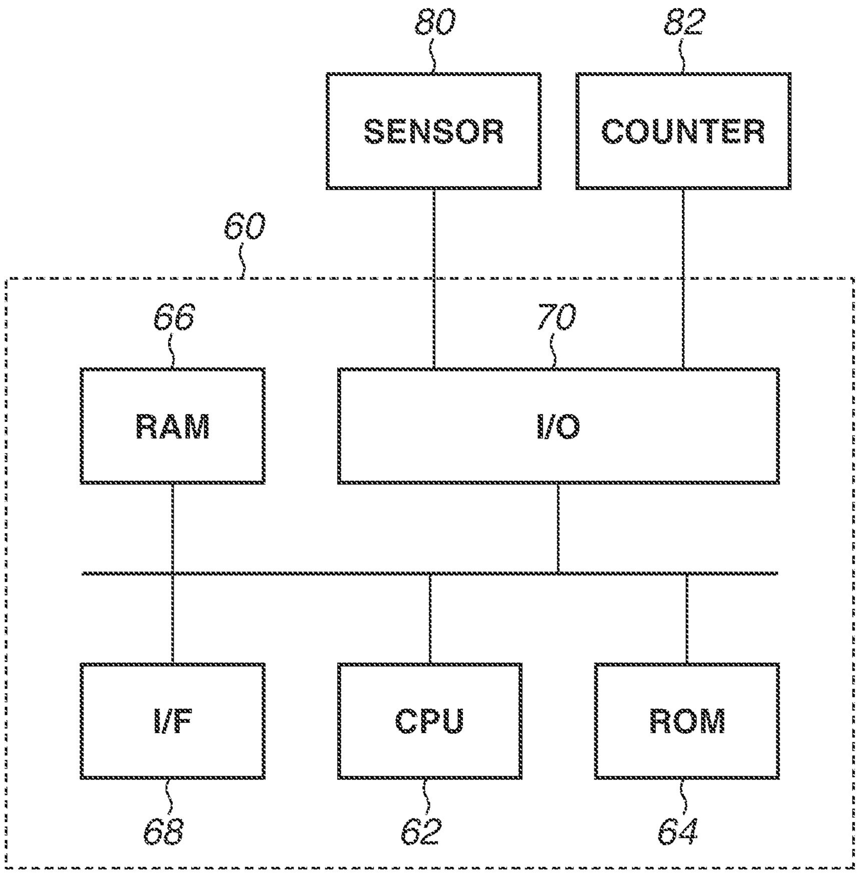
FIG. 4 is a schematic block diagram illustrating an electrical configuration according to the first exemplary embodiment.

FIG. 4 is a block diagram illustrating an outline of an electrical configuration of the recording apparatus 50. The recording apparatus 50 includes a microcomputer 60 that controls an operation of the recording apparatus 50. The microcomputer 60 includes a central processing unit (CPU) 62 that controls the microcomputer 60. Further, the CPU 62 is connected via a bus to a read-only memory (ROM) 64 that stores a program to be executed by the CPU 62 to control each unit in the recording apparatus 50 and various kinds of data. Similarly, the CPU 62 is connected to a random access memory (RAM) 66 including a storage area used as a working area of the CPU 62.

The CPU 62 is also connected to a user interface 68 and an input/output interface 70 (also referred to as I/O 70). The user interface 68 is an interface including a key (not illustrated) for a user to perform an operation and a display panel (not illustrated) for displaying various types of information. The input/output interface 70 is an interface that connects with various devices outside the microcomputer 60. The microcomputer 60 is connected to a sensor 80 and a counter 82 via the I/O 70.

Figure 2:
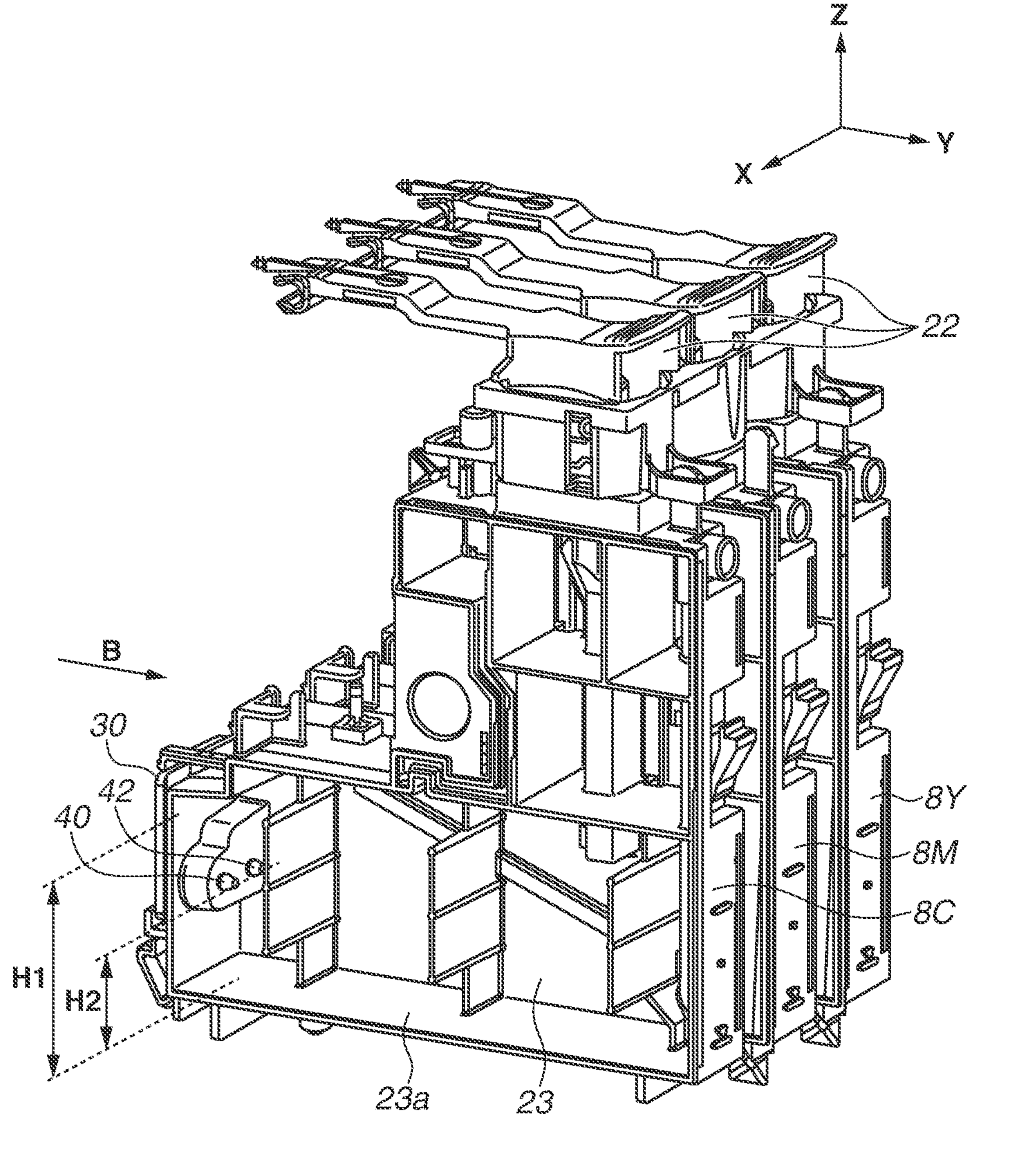
FIG. 2 is a schematic perspective view of an ink tank unit according to the first exemplary embodiment.
Figure 3:
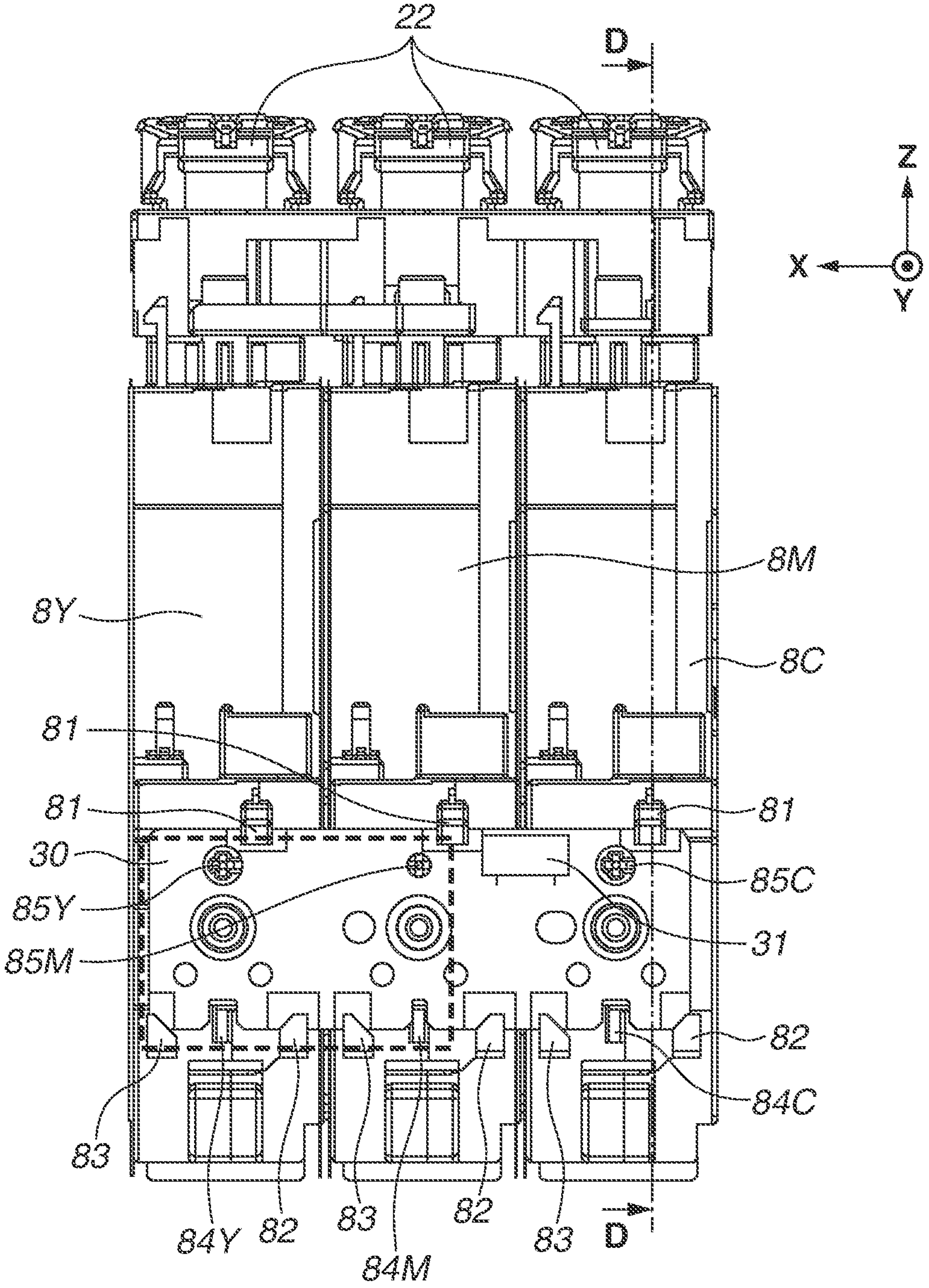
FIG. 3 illustrates the ink tank unit viewed from a −Y direction according to the first exemplary embodiment.
Figure 5:
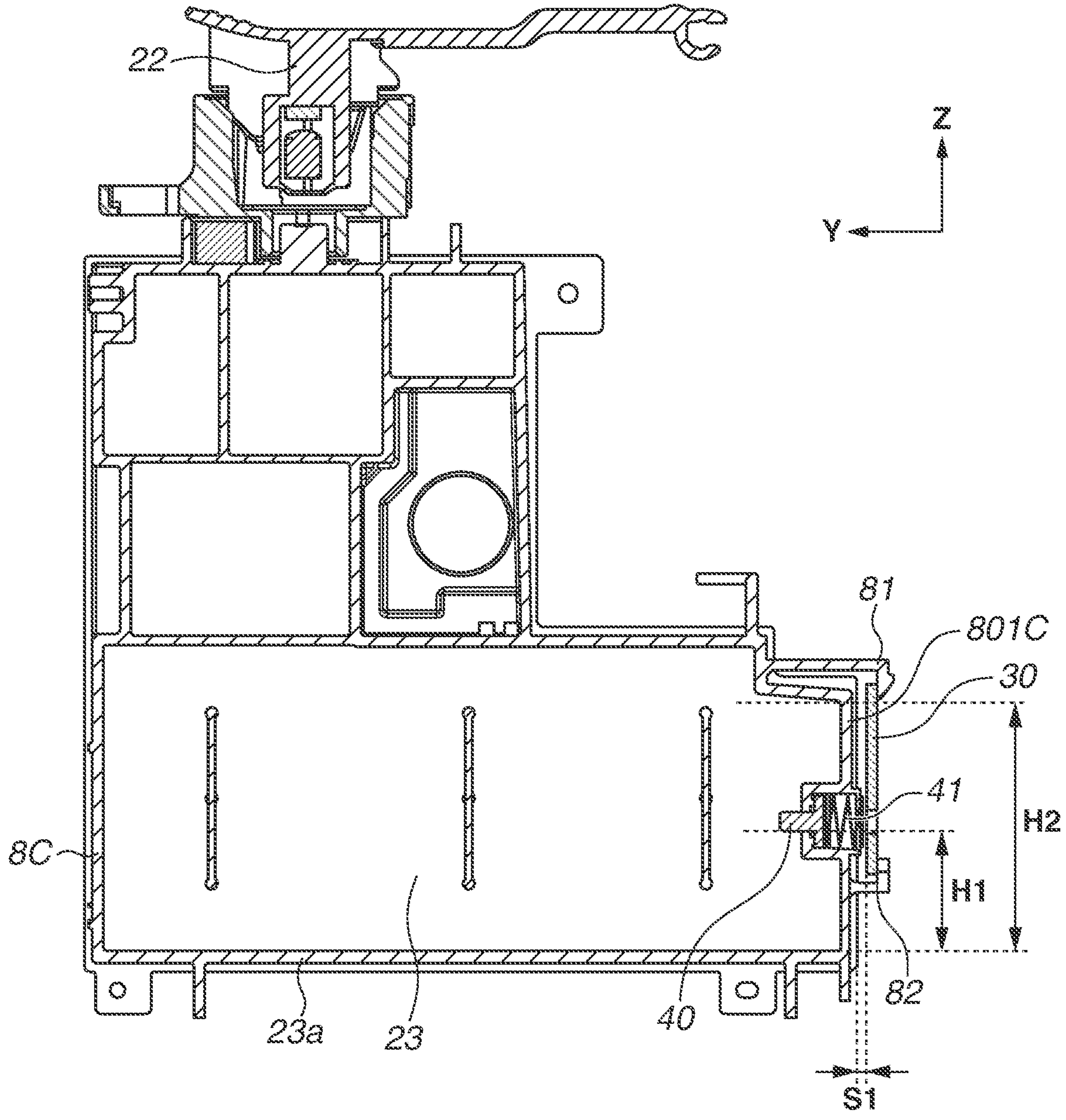
FIG. 5 is a YZ cross-sectional view of the ink tank unit cut along a D-D line in FIG. 3 according to the first exemplary embodiment.

Next, descriptions are provided with reference to FIGS. 2, 3, and 5.

FIG. 2 is a schematic perspective view of an ink tank unit. FIG. 3 illustrates the ink tank unit in FIG. 2 viewed from a −Y direction. FIG. 5 is a YZ cross-sectional view illustrating a cross section in a case where the ink tank unit is cut along a line D-D in FIG. 3 in a Y-axis direction. FIG. 2 illustrates the ink tank unit on the right side in FIG. 1, and as illustrated in FIGS. 2, 3, and 5, the ink tank unit according to the present exemplary embodiment includes the plug members 22, the ink tanks 8 of the respective colors, and a circuit board 30. As illustrated in FIGS. 2 and 5, each of the ink tanks 8 includes an ink storage unit 23 that can store ink up to a height H1. Electrode pins 40 and 42 as terminal members penetrate through each of the ink tanks 8 and are press-fitted and fixed thereto. One end portion of each of the electrode pins 40 and 42 is exposed inside the ink storage unit 23, and the other end portion is exposed to an outside surface side (−Y side) of the ink tank 8 on the back in a Y direction. At least one of the electrode pins 40 and 42 is arranged above a bottom surface 23*a* of the ink storage unit 23 by a predetermined height H2. The height H2 is closer to the bottom surface 23*a* of the ink storage unit 23 than the height H1, and a height relationship in a Z direction in FIGS. 2 and 5 is the height H2<the height H1. There is an ink tank unit including the ink tank 8K on the left side of the front of the apparatus illustrated in FIG. 1, and except for the fact that there is only one tank, the configuration is the same as that of the ink tank unit provided with the ink tanks 8C, 8M, and 8Y described above.

Both of the electrode pins 40 and 42 may be arranged at a position where the height from the bottom surface 23*a* is the height H2, or either one of them may be arranged at a position lower than the height H2. The present exemplary embodiment is not limited to the configuration including two electrode pins and may be provided with three or more electrode pins. As illustrated in FIG. 5, the electrode pins 40 and 42 are electrically connected to the circuit board 30 by a compression spring 41.

Further, an electrical configuration of the recording apparatus 50 is described with reference to FIG. 4. The circuit board 30 is connected to a power supply (not illustrated) by a cable (not illustrated) connected to a connector 31, and voltage is applied to the electrode pins 40 and 42 via the power supply under the control of the CPU 62. The above-described sensor 80 detects whether the electrode pins 40 and 42 are electrically connected by detecting a value of resistance generated between the electrode pins 40 and 42 based on the voltage applied to the electrode pins 40 and 42 from the power supply. If it is detected that the electrode pins 40 and 42 are not electrically connected, the sensor 80 outputs the detection result to the microcomputer 60.

The I/O 70 is connected to the counter 82 that counts the number of times ink is ejected from the recording head 4 for each ink. The ROM 64 stores an ink ejection amount per ejection from the recording head 4, and the microcomputer 60 calculates an ink consumption amount by multiplying the count value by the counter 82 by the ink ejection amount per ejection. The ink consumption amount is calculated using the counter 82 as described above, and thus it is possible to count the ink consumption amount from the time when the electrode pins 40 and 42 are electrically disconnected. Information about an ink remaining amount in the ink storage unit 23, which is obtained based on the ink consumption amount calculated by the microcomputer 60, is written to the ROM 64 at a predetermined timing, such as after the recording operation by the recording apparatus 50 is finished. Accordingly, the ink remaining amount after the electrode pins 40 and 42 are electrically disconnected can be managed in detail.

Next, a configuration for holding the circuit board 30 with respect to a main tank according to the present exemplary embodiment is described.

In the description, the ink tank 8C is described as an example, but the ink tanks 8Y and 8M have the same configuration. As illustrated in FIG. 5, the one end portions of the electrode pins 40 and 42, which are press-fitted to the ink tank 8C are exposed inside the ink storage unit 23, and the other end portions are exposed to the outside of the ink storage unit 23. The electrode pins 40 and 42 and a connection portion (not illustrated) of the circuit board 30 are electrically connected by being compressed and pressed in the Y direction in FIG. 5 by the compression spring 41, which is an elastic member having conductivity. An urging direction of the compression spring 41 is the Y direction in FIG. 5. The circuit board 30 is pressed in the −Y direction in FIG. 5 by a reaction force of the compression spring 41, but a position of the circuit board 30 in the −Y direction is restricted by abutting on hooks 81, 82, and 83 provided on the ink tank 8C. At this time, a gap S1 is formed between the circuit board 30 and an outside surface 801C on the back side of the ink tank 8C by the reaction force of the compression spring 41. The gaps S1 are similarly formed between the outside surfaces on the back side of the ink tanks 8Y and 8M and the circuit board 30. Bosses 85Y, 85M, and 85C and ribs 84Y, 84M, and 84C corresponding to the respective ink tanks 8 are formed on side surfaces of the respective ink tanks 8 on the back side in the Y direction as illustrated in FIG. 3. It is described in detail below, but the circuit board 30 is held in a predetermined position by the boss 85 and the rib 84 engaged with a hole portion 304 and a groove portion 307 provided on the circuit board 30.

Figure 6:
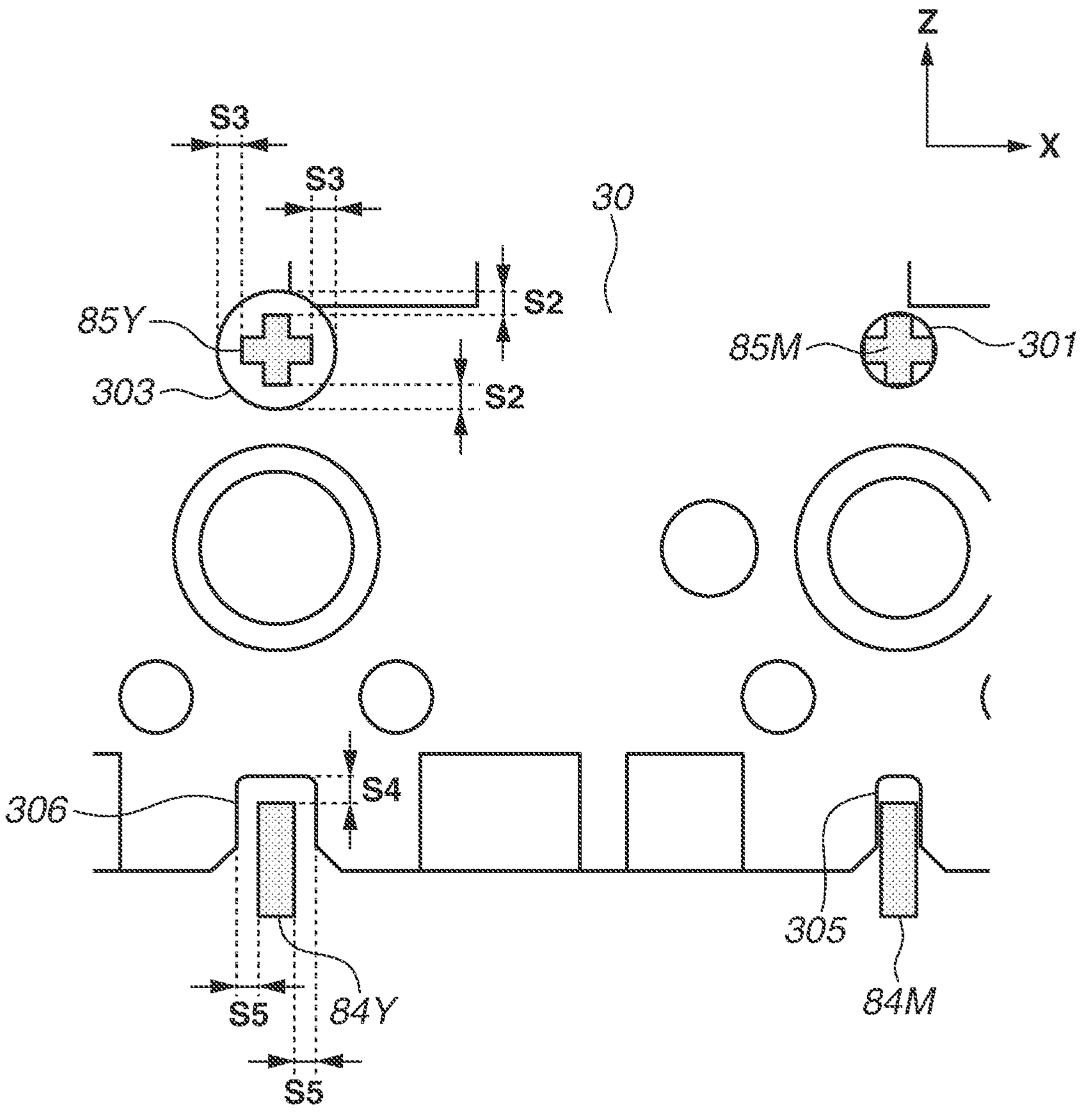
FIG. 6 is an enlarged schematic diagram illustrating a circuit board in a state of being held by each ink tank according to the first exemplary embodiment.
Figure 7:
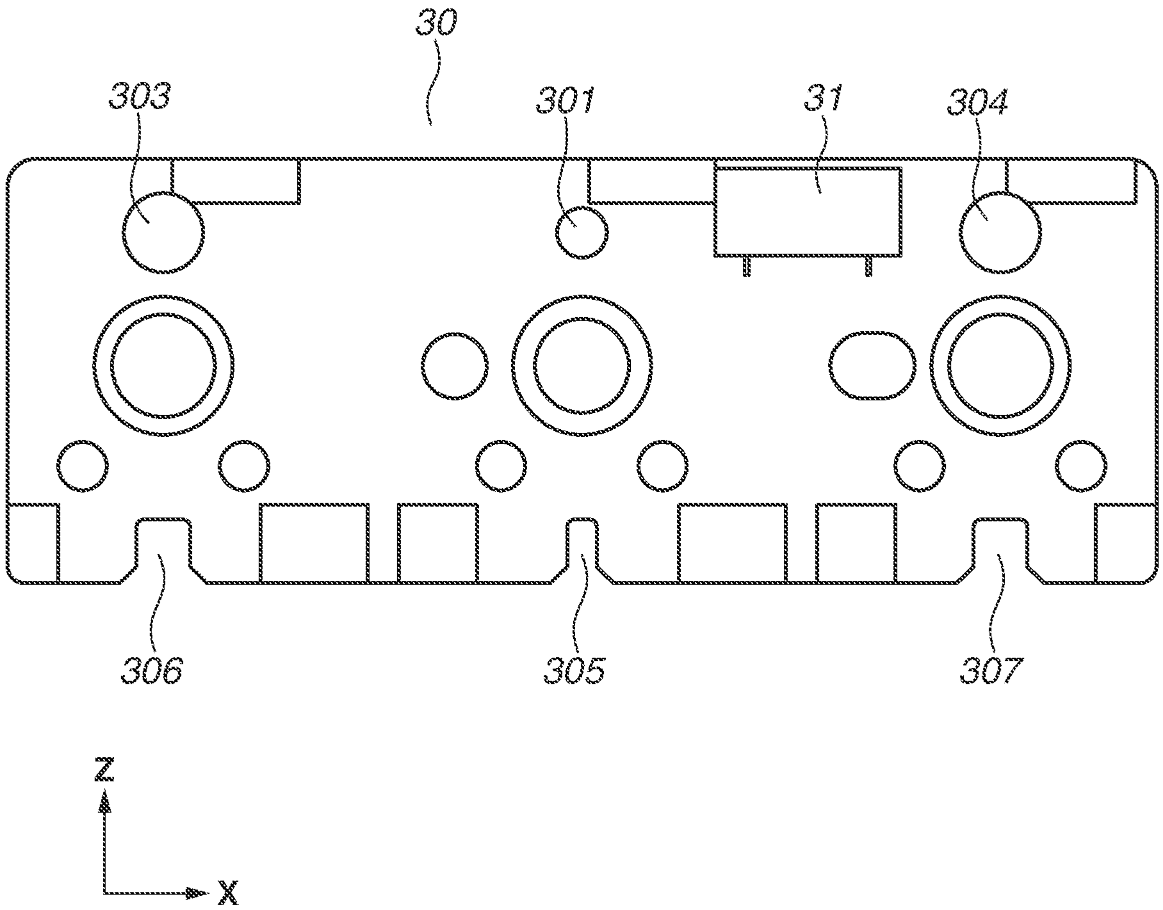
FIG. 7 is a plan view of the circuit board according to the first exemplary embodiment.

States of fitting and loose fitting of the circuit board 30 held by each of the ink tanks 8 and the configuration of the circuit board 30 are described with reference to FIGS. 6 and 7. FIG. 6 is an enlarged view of an area in a dotted line frame in FIG. 3. FIG. 7 is a plan view of the circuit board 30. The circuit board 30 includes engagement portions 303, 301, and 304 that engage with the bosses 85Y, 85M, and 85C respectively provided on the ink tanks 8Y, 8M, and 8C. The circuit board 30 further includes groove portions 306, 305, and 307 that engage with the ribs 84Y, 84M, and 84C respectively provided on the ink tanks 8Y, 8M, and 8C.

FIG. 6 illustrates a relationship between the ink tanks 8Y and 8M and the circuit board 30, but a relationship between the ink tank 8C and the circuit board 30 is similar to the relationship between the ink tank 8Y and the circuit board 30. According to the present exemplary embodiment, the boss 85M of the ink tank 8M fits with the hole portion 301 as a board side fitting portion, and the groove portion 305 as the board side fitting portion fits with the rib 84M in the X direction, so that the circuit board 30 is positioned in a ZX direction. Meanwhile, the circuit board 30 is not positioned in the X direction and the Z direction with respect to the ink tanks 8Y and 8C.

The bosses 85Y and 85C of the ink tanks 8Y and 8C are loosely fitted into hole portions 303 and 304 as board side fitting portions with gaps S2 and S3 in the Z direction and the X direction. Two gaps are indicated as the gaps S2 and S3, but widths of the respective two gaps may be equal or different. The ribs 84Y and 84C of the ink tanks 8Y and 8C are loosely fitted into the groove portions 306 and 307 as the board side fitting portions with gaps S4 and S5 in the Z direction and the X direction. Sizes of the gaps S2 to S5 may be appropriately set based on dimensions of the bosses 85C and 85Y, the ribs 84C and 84Y, the circuit board 30, and the like, and can be set to, for example, about 1.0 mm.

The ink tanks 8C, 8M, and 8Y are held in predetermined positions in predetermined orientations while being adjacent to each other by a main body frame, which is a frame member (not illustrated) forming a housing of the recording apparatus 50. However, in a case where a force or an impact is applied from the outside of the apparatus at the time of transfer or moving of the recording apparatus 50 or the like, relative positions of the ink tanks 8C, 8M, and 8Y may be displaced. The circuit board 30 is connected to the plurality of ink tanks 8, so that if the circuit board 30 is positioned and fixed with respect to each of the ink tanks 8, there is a risk that the circuit board 30 cannot absorb displacement of the relative positions of the ink tanks 8 and is applied with a load.

According to the present exemplary embodiment, the circuit board 30 and the outside surface on the back side of each of the ink tanks 8 are separated in an insertion direction of the ink tanks 8, and the gap S1 is provided therebetween as described above with reference to FIG. 5. The circuit board 30 is pressed in the −Y direction by the compression spring 41, and thus the gap S1 is formed. Thus, in a case where the relative positions of the ink tanks 8C, 8M, and 8Y are displaced in the Y direction, the gap S1 and the compression spring 41 can absorb displacement in the Y direction.

According to the present exemplary embodiment, the position of the circuit board 30 in the ZX direction is determined by fitting of the boss 85M and the rib 84M of the ink tank 8M arranged in the center of the ink tanks 8 with the hole portion 301 and the groove portion 305 of the circuit board 30. Meanwhile, the bosses 85Y and 85C and the ribs 84Y and 84C of the ink tanks 8Y and 8C are loosely fitted into the hole portions 303 and 304 and the groove portions 306 and 307 of the circuit board 30 as described above. Thus, even in a case where the relative positions of the ink tanks 8C, 8M, and 8Y are displaced in the X direction and the Z direction, the displacement can be absorbed by the loose fitting.

According to the present exemplary embodiment, the circuit board 30 is positioned in the ZX direction by the boss 85M and the rib 84M provided in the ink tank 8M, which is arranged in the center of the plurality of ink tanks 8, but may be positioned with respect to the other ink tanks. For example, the position of the circuit board 30 may be determined by the bosses 85Y and 85C and the ribs 84Y and 84C of the ink tanks 8Y and 8C according to the present exemplary embodiment. Further, the number of ink tanks 8 is not limited to three, and it may be configured that the circuit board 30 is positioned in the ZX direction with respect to one of the plurality of ink tanks 8 and is held with margins in the ZX direction with respect to the other ink tanks 8.

With the above-described configuration, even in a case where the relative positions of the plurality of ink tanks 8 are displaced, the circuit board 30 is held so as to be able to absorb the displacement each in the X, Y, and Z directions. Therefore, even if the ink tanks 8 move relative to each other due to a force applied from the outside of the recording apparatus 50 or an impact, it is possible to suppress a load from being applied to the circuit board 30 held by the ink tanks 8. Accordingly, the recording apparatus 50 can be used stably and continuously.

Other Exemplary Embodiments

Another exemplary embodiment is described below, but descriptions of configurations similar to those according to the first exemplary embodiment are omitted.

Figure 8:
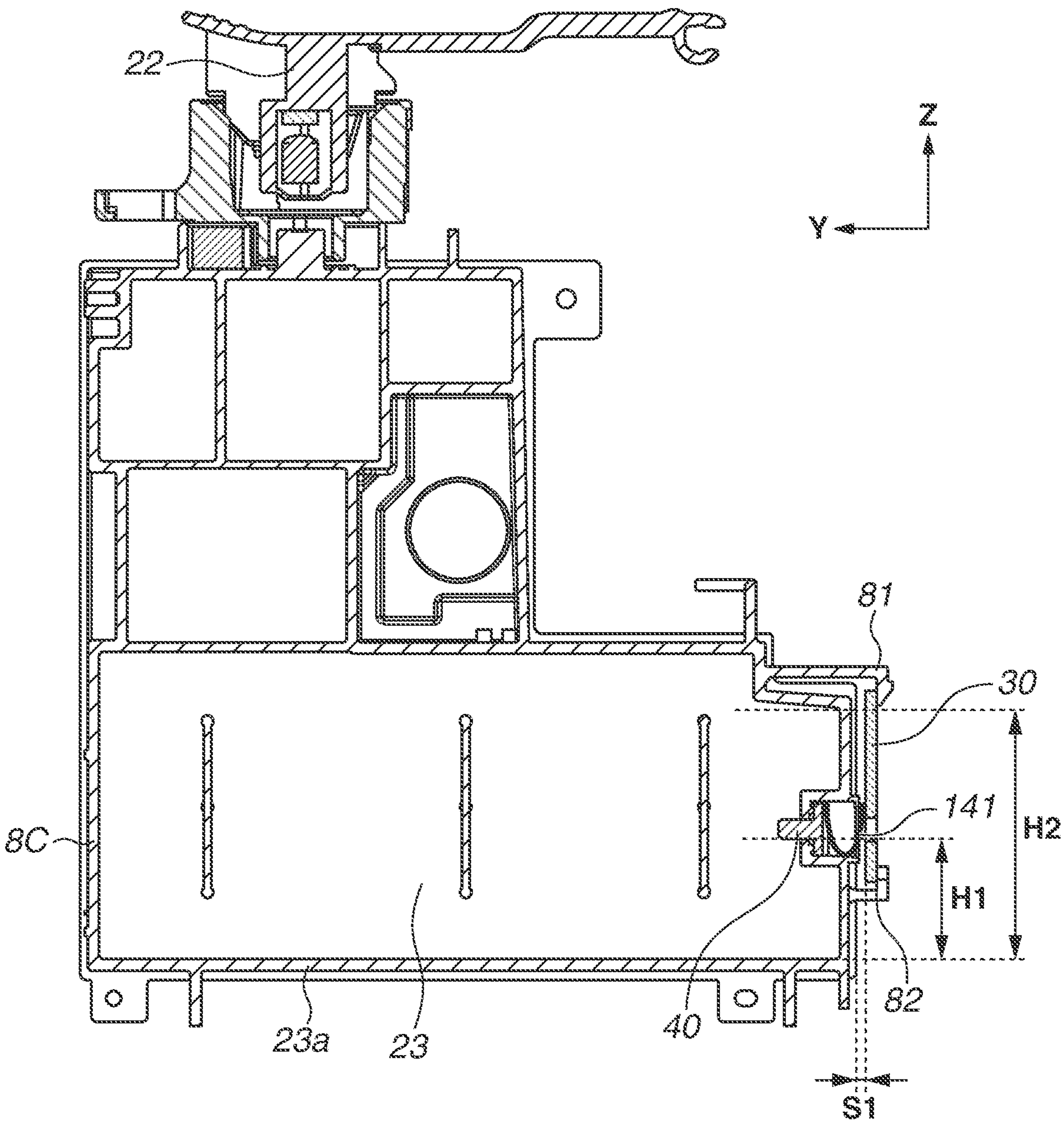
FIG. 8 is a YZ cross-sectional view of an ink tank unit according to another exemplary embodiment cut along the D-D line in FIG. 3.

FIG. 8 is a YZ cross-sectional view of the ink tank unit according to the present exemplary embodiment cut along a D-D line in FIG. 3. According to the present exemplary embodiment, the circuit board 30 and the electrode pin 40 are connected by a plate spring 141. The circuit board 30 is pressed in the −Y direction by the plate spring 141, which is an elastic member having conductivity, and the gap S1 is provided between the circuit board 30 and the side surface of each of the ink tanks 8 on the back side in the Y direction. The circuit board 30 and the electrode pin 40 may be connected by a wire spring, which is formed by bending a metal wire in a U-shape other than the plate spring. The plate spring and the wire spring are used in this manner, and accordingly, the configuration can be simplified and downsized as compared with a case where a compression spring is used for connection.

Figure 9:
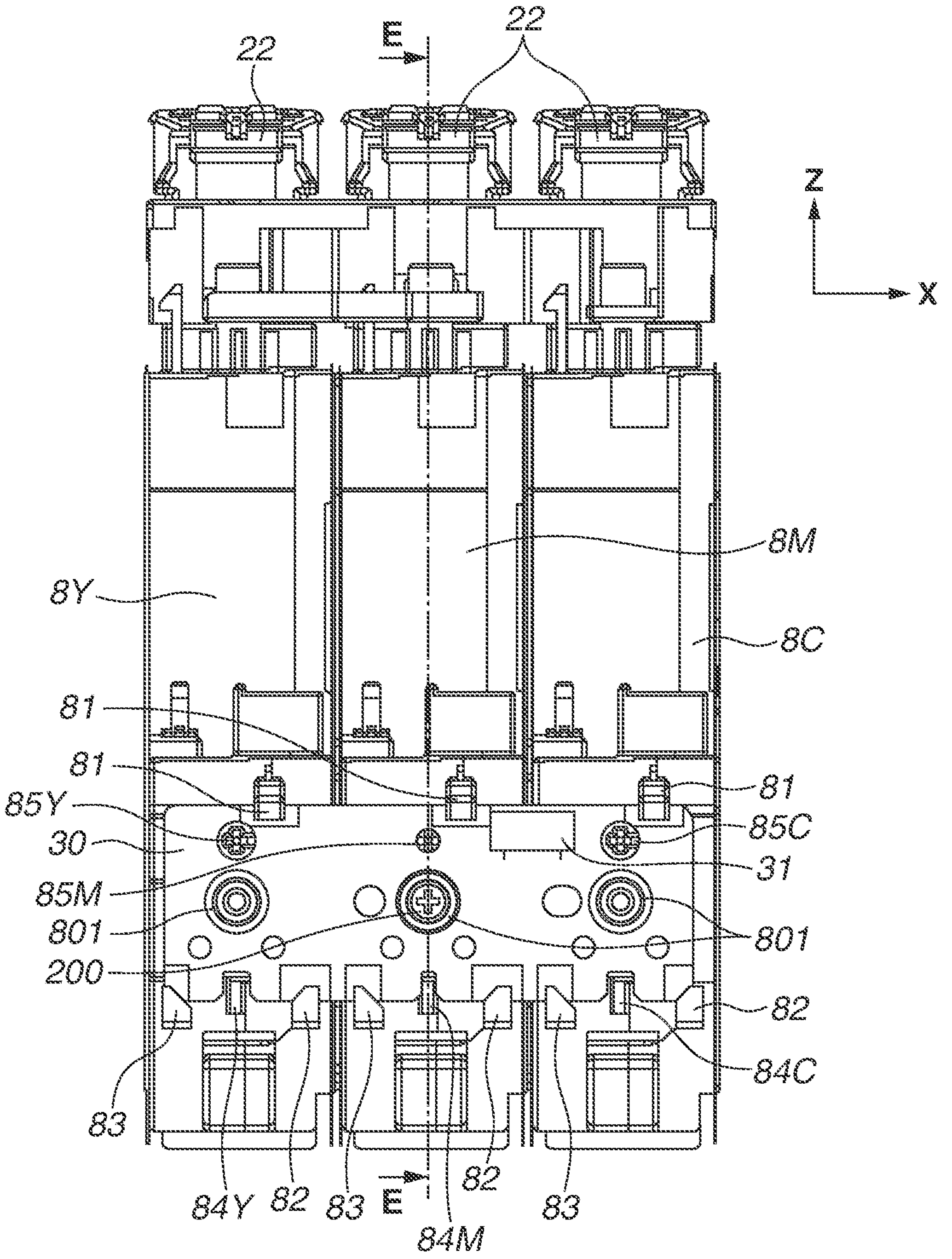
FIG. 9 illustrates the ink tank unit viewed from the −Y direction according to the other exemplary embodiment.
Figure 10:
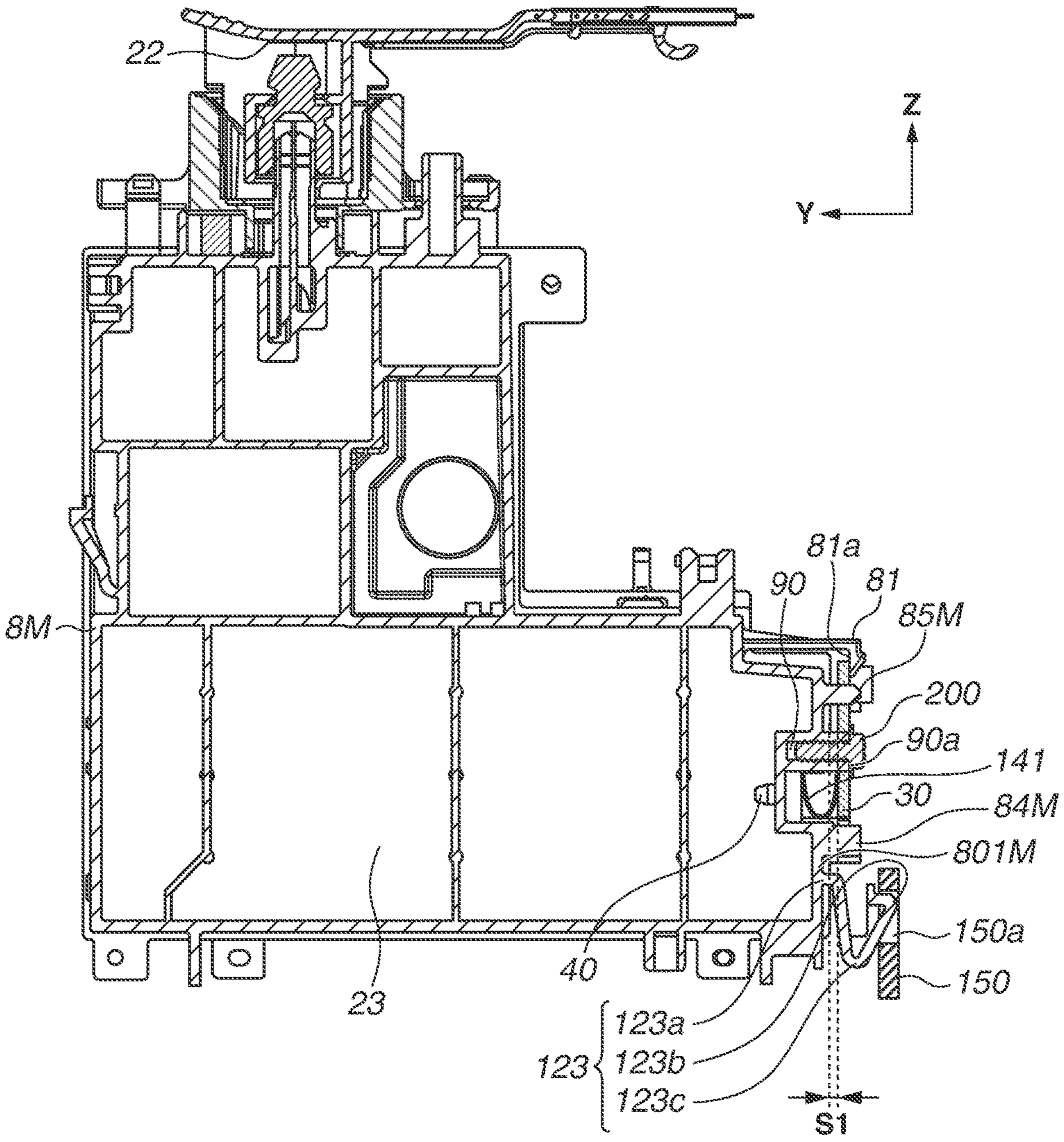
FIG. 10 is a YZ cross-sectional view of the ink tank unit cut along an E-E line in FIG. 9 according to the other exemplary embodiment.

FIG. 9 is a view of the ink tank unit according to the present exemplary embodiment viewed from the −Y direction. FIG. 10 is a YZ cross-sectional view of the ink tank unit cut along an E-E line in FIG. 9. According to the present exemplary embodiment, a screw 200 as a regulating member is mounted to a lower hole 90 as a regulating member receiving portion provided in the ink tank 8M at a position where the screw 200 abuts on an abutting portion 90*a*. A leading end of the abutting portion 90*a* is configured so that its position in the Y direction is approximately the same as that of an abutting surface 81*a* of the hook 81 provided in the ink tank 8M, and penetrates through a screw mounting hole 801 in FIG. 9. In other words, the position at which the abutting surface 81*a* of the hook 81 abuts on the circuit board 30 and the position at which the screw 200 abuts on the circuit board 30 are approximately the same position in the Y direction, which is an urging direction of the plate spring 141.

As described above, the circuit board 30 is positioned in the Y direction by abutting on the screw 200 mounted to the lower hole 90 through the screw mounting hole 801 and on the abutting surface 81*a* of the hook 81. The circuit board 30 constantly receives a pressing force from the plate spring 141 in the −Y direction, but is regulated by the abutting surface 81*a* and the screw 200, so that deformation of the circuit board 30 itself and creep deformation of the hooks 81, 82, and 83 can be suppressed.

It is desirable that a mounting position of the screw 200 is near a pressing position of the spring in order to suppress deformation of the circuit board 30. In addition, not only the ink tank 8M but also the ink tanks 8C and 8Y are configured so that the screw 200 is mounted near the pressing position of the plate spring 141, and accordingly deformation of the circuit board 30 and the hooks 81, 82, and 83 can be further suppressed. A distance between the mounting position of the screw 200 and the pressing position of the plate spring 141 may be appropriately determined in consideration of the dimensions and rigidity of the circuit board 30, and can be set to, for example, about 1.0 to 3.0 mm.

According to the present exemplary embodiment, the gap S1 is also provided between a side surface 801M of the ink tank 8M on the back side in the Y direction and the circuit board 30. Further, the gaps S1 are similarly provided between the side surfaces on the back side of the ink tanks 8Y and 8C in the Y direction and the circuit board 30. Thus, even in a case where the ink tanks 8 move relative to each other, it is possible to absorb the displacement. Further, as in the first exemplary embodiment, the circuit board 30 is mounted to the ink tanks 8Y and 8C to be loosely fitted in the ZX direction. Thus, even in a case where the ink tanks 8 move relative to each other in the X direction and the Z direction, it is possible to absorb the displacement.

The ink tank 8M according to the present exemplary embodiment is provided with a fixing hook 123, which is a mounting portion with respect to the main body frame. The ink tanks 8C and 8Y are also provided with the fixing hooks 123 in the same manner. The fixing hook 123 is inserted into a mounting hole 150*a* of a mounting rib 150 provided on the main body frame in a case where the ink tanks 8 are installed in the recording apparatus 50. The ink tanks 8 according to the present exemplary embodiment are installed in predetermined positions while moving from top to bottom in the Z direction with respect to the main body frame. In a case where the ink tanks 8 are installed, a regulating portion 123*b* of the fixing hook 123 comes into contact with the main body frame along with the installation operation of the ink tanks 8 and moves downward while being pressed and deformed in the +Y direction in FIG. 10. Then, if the regulating portion 123*b* reaches the mounting hole 150*a*, the deformation is released, and the regulating portion 123*b* is inserted into the mounting hole 150*a*.

The fixing hook 123 has a V shape in which a lower part of a fixing hook arm portion 123*c* is curved from a base portion 123*a*. The fixing hook 123 is configured to connect with the regulating portion 123*b*. The fixing hook 123 may be curved to form a U-shape. In a case where heights of the base portion 123*a* and the regulating portion 123*b* are greatly different from each other upward in the Z direction, the regulating portion 123*b*, which is pressed by the main body frame at the time of the installation of the ink tanks 8, is deformed to rotate on a YZ plane around the base portion 123*a*. For example, if the regulating portion 123*b* is deformed by moving in a counterclockwise direction around the base portion 123*a* in FIG. 10, the regulating portion 123*b* is located higher in the Z direction compared with a case where it is not deformed. Thus, in order to insert the regulating portion 123*b* into the mounting hole 150*a*, it is necessary to provide the mounting hole 150*a* in consideration of a position of the deformed regulating portion 123*b*, and if the insertion is completed and the deformation of the regulating portion 123*b* is released, a gap is generated between the mounting hole 150*a* and the regulating portion 123*b* in the Z direction.

Meanwhile, in the fixing hook 123 according to the present exemplary embodiment, the base portion 123*a* and the regulating portion 123*b* are configured at approximately the same height in the Z direction. Thus, if the regulating portion 123*b* is pressed by the main body frame in the +Y direction at the time of installation of the ink tanks 8, the regulating portion 123*b* deforms by moving almost parallel to the +Y direction as the curvature of the fixing hook arm portion 123*c* shrinks. Accordingly, the regulating portion 123*b* is installed without deforming so as to move upward in the installation of the ink tanks 8, and thus, the mounting hole 150*a* can be provided without considering the deformation in the Z direction as described above. Accordingly, the insertion of the regulating portion 123*b* into the mounting hole 150*a* is completed, and it is possible to suppress a gap from being generated between the mounting hole 150*a* and the regulating portion 123*b* in the Z direction in the state in which the deformation of the regulating portion 123*b* is released.

Accordingly, in the state in which the regulating portion 123*b* is inserted into the mounting hole 150*a*, even if the ink tanks 8 try to move with respect to the main body frame, the movement is restricted by the mounting hole 150*a*, and a movement amount can be reduced. Thus, it is also possible to reduce a displacement amount in a case where each of the ink tanks 8C, 8M, and 8Y moves relative to each other. A height difference in the Z direction between the regulating portion 123*b* and the base portion 123*a* may be appropriately determined in consideration of the dimensions and rigidity of the fixing hook 123, and can be set to, for example, about 1.0 to 3.0 mm.

With the above-described configuration, the circuit board 30 is held against the ink tanks 8 so as to absorb the displacement amount even in a case where the ink tanks 8 move relative to each other, and thus the circuit board 30 can be suppressed from being damaged. Further, since each of the ink tanks 8C, 8M, and 8Y is provided with the fixing hook that is inserted into the main body frame, the displacement amount in the relative movement between the ink tanks 8 can also be reduced, and thus, the circuit board 30 can be further suppressed from being damaged.

According to the other exemplary embodiment, the configuration is described in which the electrode pin 40 and the circuit board 30 are connected by the plate spring, but a similar effect can be exhibited even with a configuration in which the electrode pin 40 and the circuit board 30 are connected by a compression spring as in the first exemplary embodiment.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-067939, filed Apr. 15, 2022, which is hereby incorporated by reference herein in its entirety.

What is claimed is:

1. A liquid ejection apparatus comprising:

a first liquid storage container configured to store liquid to be supplied to a liquid ejection head configured to eject the liquid to an ejection medium;

a second liquid storage container configured to be arranged side by side in a first direction with respect to the first liquid storage container;

a first terminal member configured to come into contact with the liquid stored within the first liquid storage container;

a second terminal member configured to come into contact with liquid stored within the second liquid storage container; and a circuit board configured to come into contact with the first terminal member and the second terminal member and to relatively move in both the first direction and a second direction crossing the first direction with respect to the first liquid storage container;

wherein the first terminal member and the circuit board are connected by a first elastic member having conductivity, and the second terminal member and the circuit board are connected by a second elastic member having conductivity, wherein the first elastic member and the second elastic member apply a force to the circuit board connected to the first terminal member and the second terminal member in a third direction that crosses both of the first direction and the second direction.

2. The liquid ejection apparatus according to claim 1, wherein the circuit board is configured to relatively move in the second direction with respect to the first liquid storage container and is positioned in the second direction with respect to the second liquid storage container.

3. The liquid ejection apparatus according to claim 1, wherein the circuit board is configured to relatively move in the first direction with respect to the first liquid storage container and is positioned in the first direction with respect to the second liquid storage container.

4. The liquid ejection apparatus according to claim 1, wherein, in the circuit board, a first engagement portion provided in the first liquid storage container is loosely fitted to a board side engagement portion provided in the circuit board, and a second engagement portion provided in the second liquid storage container is fitted to a board side fitting portion provided in the circuit board.

5. The liquid ejection apparatus according to claim 1, wherein the third direction is a direction away from both of an outside surface of the first liquid storage container and an outside surface of the second liquid storage container.

6. The liquid ejection apparatus according to claim 1, wherein at least one of the first liquid storage container and the second liquid storage container includes a first regulating portion configured to regulate movement of the circuit board in the third direction.

7. The liquid ejection apparatus according to claim 6, wherein movement of the circuit board in the third direction is regulated by a second regulating portion near a connection portion at which the circuit board and the second elastic member are connected.

8. The liquid ejection apparatus according to claim 7, wherein the first regulating portion and the second regulating portion regulate the circuit board at an approximately same position in the third direction.

9. The liquid ejection apparatus according to claim 1, wherein the first liquid storage container and the second liquid storage container are arranged within a housing of the liquid ejection apparatus.

10. The liquid ejection apparatus according to claim 1, wherein the first terminal member includes a first end portion exposed to an inside of the first liquid storage container and a second end portion exposed to an outside of the first liquid storage container, and wherein the second terminal member includes a third end portion exposed to an inside of the second liquid storage container and a fourth end portion exposed to an outside of the second liquid storage container.

11. The liquid ejection apparatus according to claim 1, wherein the liquid is ink that includes a coloring material.

* * * * *